United States Patent
Aoki et al.

(10) Patent No.: US 6,804,070 B2
(45) Date of Patent: Oct. 12, 2004

(54) MAGNETIC TRANSFER APPARATUS

(75) Inventors: Masashi Aoki, Kanagawa-ken (JP); Akito Kamatani, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 201 days.

(21) Appl. No.: 09/949,676

(22) Filed: Sep. 12, 2001

(65) Prior Publication Data

US 2002/0030909 A1 Mar. 14, 2002

(30) Foreign Application Priority Data

Sep. 12, 2000 (JP) ........................ 2000-275838
May 15, 2001 (JP) ........................ 2001-144296

(51) Int. Cl.[7] ................................ G11B 5/36
(52) U.S. Cl. ........................ 360/17; 360/16
(58) Field of Search ........................ 360/16, 17

(56) References Cited

U.S. PATENT DOCUMENTS

| | | | |
|---|---|---|---|
| 4,071,869 A | 1/1978 | Feierabend et al. | |
| 5,121,258 A | 6/1992 | Chi et al. | |
| 5,991,104 A | 11/1999 | Bonyhard | |
| 6,347,016 B1 * | 2/2002 | Ishida et al. | |
| 6,469,848 B1 * | 10/2002 | Hamada et al. | 360/17 |

FOREIGN PATENT DOCUMENTS

| | | | |
|---|---|---|---|
| EP | 0 915 456 A1 | 5/1999 | G11B/5/86 |
| EP | 1 205 915 A2 | 5/2002 | |
| EP | 1 251 495 A2 | 10/2002 | |
| JP | 63-183623 | 7/1988 | G11B/5/86 |
| JP | 7-78337 | 3/1995 | G11B/5/86 |
| JP | 07078337 A * | 3/1995 | G11B/5/66 |
| JP | 11-161956 | 6/1999 | G11B/5/86 |
| JP | 10-40544 | 8/1999 | A47J/27/00 |
| JP | 10-269566 | 4/2000 | F25B/41/06 |

OTHER PUBLICATIONS

Japanese Abstract No. 07078337, dated Mar. 20, 1995.
Patent Abstract of Japan 63–183623 Jul. 29, 1988.
Patent Abstract of Japan 07–078337 Mar. 20, 1995.
Patent Abstract of Japan 11–161956 Jun. 18, 1999.

* cited by examiner

Primary Examiner—David Hudspeth
Assistant Examiner—Rocio Colon
(74) Attorney, Agent, or Firm—Sughrue Mion, PLLC

(57) ABSTRACT

A magnetic transfer apparatus capable of enhancing the quality of a transfer signal by improving close contact property between master and slave media in magnetic transfer carried out to magnetically transfer an information signal such as a servo signal from the master medium to the slave medium. In the magnetic transfer specifically carried out by applying a transfer magnetic field in a close contact state of the master medium bearing information and the slave medium, the master and slave media are closely contacted with each other in a state where the backside of the master medium is adsorbed and held on the flat adsorbing surface of an adsorbing member to heighten the flatness of the master medium. In the case of one-surface transfer, preferably, an elastic body is closely contacted with the surface opposite to the master medium on the slave medium.

17 Claims, 3 Drawing Sheets

MAGNETIC TRANSFER APPARATUS

BACKGROUND OF THE INVENTION

1. Field of the Invention

The present invention relates to a magnetic transfer apparatus for magnetically transferring information from a master medium bearing the information to a slave medium.

2. Description of the Prior Art

With regard to a magnetic recording medium, generally, a large-capacity and inexpensive medium capable of recording a greater deal of information has been preferred with an increase in the quantity of information. More preferably, one capable of reading a necessary spot within a short time, so-called a medium allowing high-speed access, has been in demand. As one example, a high-density flexible disc is known and, in order to realize a large capacity thereof, a so-called tracking servo technology plays a large role, which is adapted to accurately scan tracks with narrow widths by a magnetic head, and reproduce signals with a high S/N ratio. In one round of a disc, a servo signal for tracking, an address information signal, a reproducing clock signal and the like are recorded in a so-called preformat at given intervals.

The magnetic head is set to accurately travel on a track by reading the signals in the preformat and correcting its own position. Current preformats are created one by one, or one track by one track, by using a dedicated servo write apparatus.

However, such a servo write apparatus is expensive, and the creation of preformats takes a long time. Consequently, the creation step of preformats accounts for a large part of manufacturing costs, leading to a desire for cost reduction.

On the other hand, instead of creating a preformat one track by one track, another method of realization thereof by a magnetic transfer method has been proposed. As to the magnetic transfer method, disclosures have been made in, for examples, Japanese Unexamined Patent Publication Nos. 63(1988)-183623, 10(1998)-40544, 10(1998)-269566 and the like. Magnetic transfer is designed to transfer a magnetization pattern corresponding to information (e.g., servo signal) born on a master medium by applying a transfer magnetic field while the master medium is in a close contact with a slave medium. Static recording can be carried out without changing the relative positions of the master and slave media, accurate preformat recording can be carried out, and time necessary for the recording is extremely short.

To enhance the quality of transfer in the magnetic transfer, it is a large problem to bring the master and slave media into contact as close as possible without any gaps therebetween. If there is a close-contact failure, then an area of no magnetic transfer occurrence may be formed. If no magnetic transfer occurs, then there will be signals missing in the magnetic information transferred to the slave medium, thereby lowering signal quality. If a recorded signal is a servo signal, then a sufficient tracking function cannot be obtained, reducing reliability.

As one means of solving the foregoing problem, Japanese Unexamined Patent Publication No. 7(1995)-78337 discloses a technology for improving the close-contact property between the master and slave media by pressing the entire back side of the master medium with uniform pressure applied by press-contact means using an elastic body.

As another solution, Japanese Unexamined Patent Publication No. 11(1999)-161956 discloses a technology for improving the close-contact property by curving the center of the master medium into a convex shape protruding to the slave medium side, and bringing the master and slave media into close contact with each other while gradually flattening the master medium from the center to the outside by contact pressure while in close contact with the slave medium, thereby discharging air without any remaining in the close contact surface.

The foregoing solution is employed on the assumption that the master medium is basically flat. Depending on the forming method of a master medium or the like, it has been difficult to ensure sufficient flatness. Consequently, in such a master medium, a close-contact failure is not completely eliminated, bringing about insufficient close-contact property. Especially, in the case where magnetic transfer is simultaneously performed for the both surfaces of the slave medium by bringing the master media into close contact with both sides of the slave medium, the close contact cannot be obtained due to the difference in flatness between the master media on either side of the slave medium.

In addition, in the case of one, e.g., the foregoing conventional example, for obtaining flatness by deforming the master medium in the contact pressure stage, there is a possibility that friction in accordance with the deformation will be generated between the slave medium surface and the master medium, and damage will be given to a micro uneven pattern bearing the transfer information on the master medium surface, or the recording surface of the slave medium. In particular, if a flexible disc is used as a slave medium, deformation may possibly occur in the slave medium.

If an outer peripheral part or the like of the master medium is clamped when the master medium is fixed in a transfer position, a force is applied to a part of the master medium. Thus, the master medium may be deformed or destroyed. In addition, when the master medium is fixed by adhesive, it may be difficult to uniformly coat the adhesive. Such nonuniform coating of adhesive may damage the flatness of the master medium, as well as making it difficult to peel off the adhesive when the master medium is replaced by another. Consequently, the costly master medium may be damaged.

SUMMARY OF THE INVENTION

The present invention was made with the foregoing problems in mind, and it is an object of the invention to provide a magnetic transfer apparatus capable of enhancing the quality of a transfer signal by ensuring flatness of a master medium in magnetic transfer and improving the close-contact property between slave and master media.

In accordance with the present invention, a magnetic transfer apparatus is provided for performing magnetic transfer by bringing a master medium bearing transfer information and a slave medium subjected to the magnetic transfer into close contact with each other and applying a transfer magnetic field thereto. The magnetic transfer apparatus is characterized by having an adsorbing member having a flat surface for adsorbing and holding the backside of the master medium. In this case, the master medium is brought into close contact with the slave medium in an enhanced flatness state thereof.

The adsorbing member is constituted of a substance having an adsorbing surface, which has a predetermined flatness and a number of open suction holes alternatively a porous substance having an adsorbing surface, which has micro open suction holes therein. The suction holes on the adsorbing surface are connected through a suction passage to a vacuum pump for suction. The master medium is vacuum-adsorbed, and the flatness of the master medium is corrected along the adsorbing surface.

In the case of one-surface transfer, it is preferable that the master medium having had its flatness enhanced by adsorbing and holding its back side on the flat surface of the adsorbing member be brought into close contact with one surface of the slave medium, and an elastic body brought into contact with the opposite surface of the slave medium.

When the master medium has low rigidity, it is preferable that the intervals between the openings of the suction holes be reduced, and suction performed uniformly for an entire surface of the master medium through a number of suction holes. More preferably, the suction should be performed by the porous substance.

When the master medium is removed from the adsorbing member, it is preferable that the removal from the adsorbing surface be carried out by feeding pressurized air to the suction holes.

Preferably, an outer diameter of the master medium should be set larger than that of the recording area of the slave medium, and an inner diameter of the master medium should be set smaller than that of the slave medium.

When magnetic transfer is performed, it is preferable that the slave medium be subjected to initial DC magnetization beforehand in an in-plane tracking direction of the slave medium in the case of in-plane recording, or in a vertical direction to the slave medium in the case of vertical recording. Then, magnetic transfer is carried out by bringing the slave medium into close contact with the master medium, and applying a transfer magnetic field in a direction roughly reverse to the initial DC magnetization direction thereof in the tracking direction or the vertical direction.

As described above, according to the present invention, the adsorbing member is provided, capable of enhancing the flatness of the master medium by adsorbing the backside of the master medium brought into contact with the slave medium on a flat surface when magnetic transfer is performed in a state of close contact between the master and slave media. Hence, it is possible to secure close contact property with the slave medium on an entire surface thereof by enhancing the flatness of the master medium, and to prevent the occurrence of missing signals caused by a close contact failure. Then, transfer signal quality is enhanced to improve reliability.

No deformation occurs in the master medium when the slave and master media are pressed into contact with each other, and no friction occurs therebetween. Thus, it is possible to enhance the durability of the master medium, while preventing the occurrence of damage to the slave medium caused by the deformation or the like.

In the case of one-surface transfer, the master medium having a back side held by the adsorbing member is brought into close contact with one surface of the slave medium, and the elastic body is brought into close contact with the opposite surface of the slave medium. Accordingly, without any reduction in close-contact property caused by a difference in flatness between the master media on both sides of the slave medium as in the case when the master media are brought into close contact with both sides thereof, it is possible to further improve close contact property between the slave and master media.

When an adsorbing member made of a porous substance is used, an air suction structure can be simplified, and the suction holes on the surface can be micronized. Thus, it is possible to perform good suction and holding for the master medium having low rigidity while the flatness thereof is secured.

When the master medium is removed, it is possible to facilitate the removal of the master medium by feeding pressurized air to the suction holes.

DESCRIPTION OF THE PREFERRED EMBODIMENTS

Figure 1:
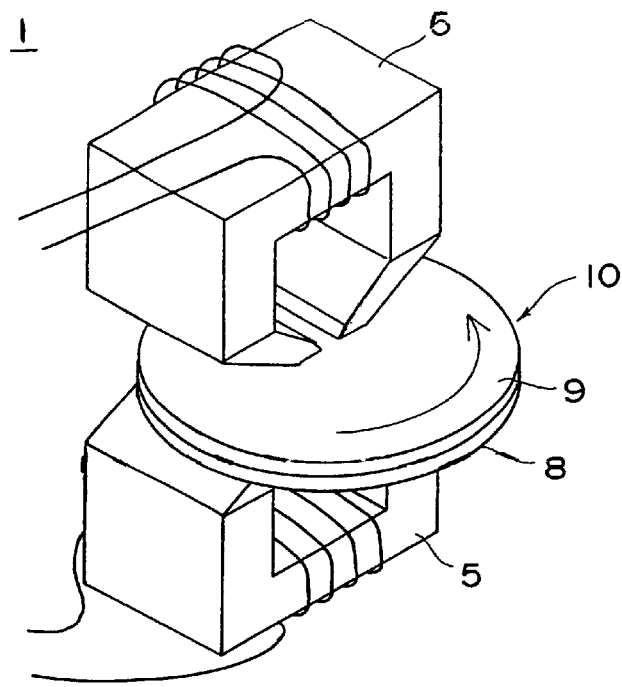
FIG. 1 is a main portion perspective view showing a transfer state of a magnetic transfer apparatus according to one embodiment of the present invention.
Figure 2:
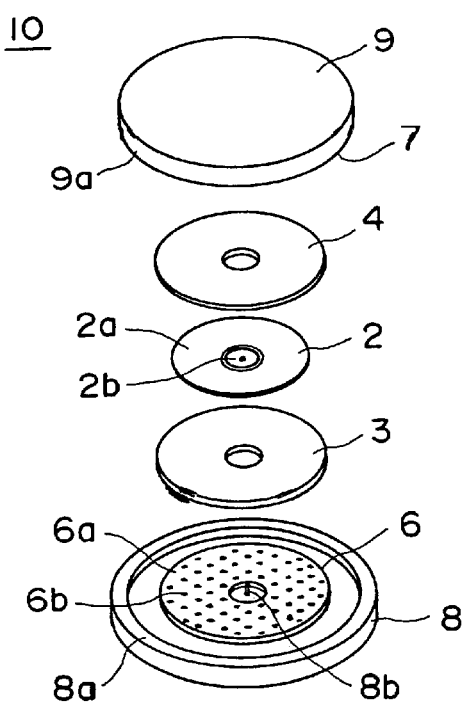
FIG. 2 is an exploded perspective view showing a close contact body of a first embodiment.
Figure 3:
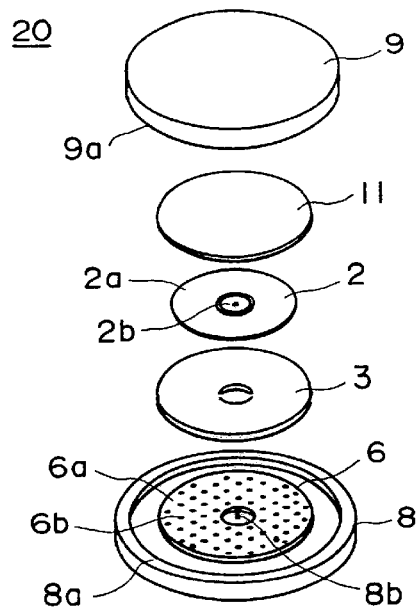
FIG. 3 is an exploded perspective view showing a close contact body according to a second embodiment.
Figure 4:
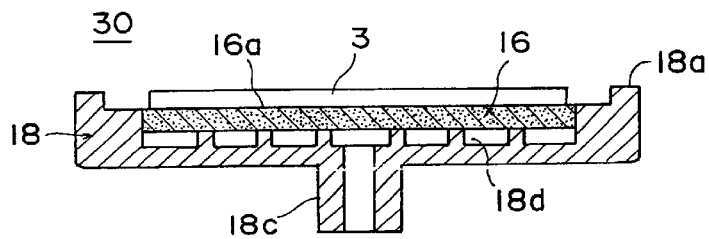
FIG. 4 is a sectional view showing main portions of a close contact body according to a third embodiment.
Figure 5:
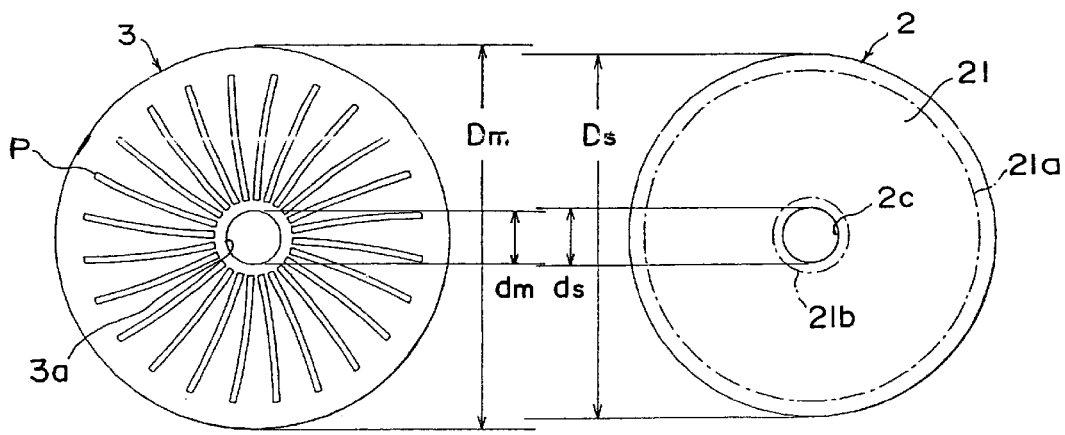
FIG. 5 is a plan view showing a dimensional relation between master and slave media.
Figure 6A:
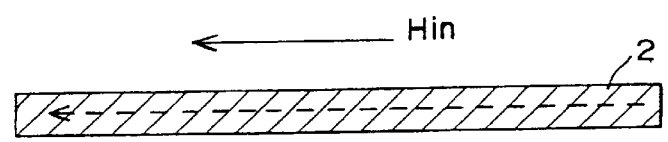
FIGS. 6A to 6C are views showing a basic process of a magnetic transfer method.
Figure 6B:
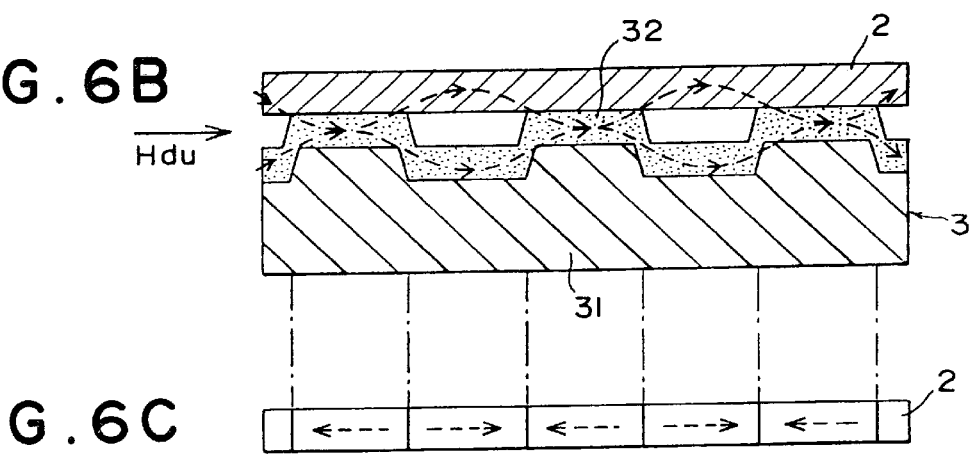
Figure 6C:
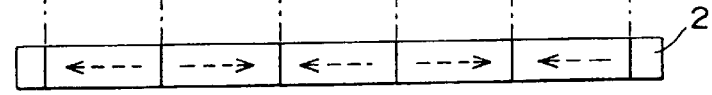

The preferred embodiments of the present invention will be described in detail hereinafter. FIG. 1 is a perspective view of a main portion showing a transfer state of a magnetic transfer apparatus according to one embodiment of the present invention; FIG. 2 is an exploded perspective view showing a close contact body according to a first embodiment; FIG. 3 is an exploded view showing a close contact body according to a second embodiment; FIG. 4 is a sectional view showing a main portion of a close contact body according to a third embodiment; FIG. 5 is a plan view showing a dimensional relation between a slave and a master media; and FIGS. 6A to 6C are views showing a basic process of magnetic transfer. Each is a schematic diagram, and a thickness and the like are represented at a ratio different from actual dimensions.

A magnetic transfer apparatus 1 shown in FIGS. 1 and 2 is adapted to perform both-surface simultaneous transfer by an in-plane recording system. Specifically, while a close contact body 10 constructed by pressing master media 3 and 4 into close contact with the upper and lower sides of a slave medium 2 is rotated, transfer magnetic fields are applied by magnetic field application units 5 (electromagnetic units) disposed above and below the close contact body 10. Then, information born on each of the master media 3 and 4 is simultaneously transferred and recorded magnetically on each surface of the slave medium 2.

The close contact body 10 includes: the lower master medium 3 for transferring information such as a servo signal to the lower recording surface of the slave medium 2; the upper master medium 4 for transferring information such as a servo signal to the upper recording surface of the slave medium 2; a lower press-contact member 8 having a lower adsorbing member 6 for correcting flatness by adsorbing and holding the lower master medium 3; and an upper press-contact member 9 having an upper adsorbing member 7 (similar in constitution to the lower adsorbing member 6) for correcting flatness by adsorbing and holding the upper master medium 4. These components are pressed into contact while the center positions thereof are aligned, and the lower and upper master media 3 and 4 are brought into close contact with both surfaces of the slave medium 2.

The slave medium 2 shown in the drawing is a flexible disc having a hub 2b fixed to the center of a disc recording medium 2a. The recording medium 2a includes recording surfaces formed of a magnetic layer on both surfaces of a disc base made of a flexible polyester sheet or the like. This slave medium may be a hard disc.

The lower and upper master media 3 and 4 are formed to be annular discs. Each of the media 3 and 4 is provided with a transfer information bearing plane formed on one surface with micro uneven patterns (described later with reference to FIGS. 6A to 6C), and is brought into close contact with the recording surface of the slave medium 2. The opposite surface to the transfer information bearing plane of each of the master medium 3 and 4 is vacuum-adsorbed and held to each of lower and upper adsorbing members 6 and 7. The lower and upper master media 3 and 4, to improve the close contact property with the slave medium 2 as necessary, have micro holes formed in positions other than the forming parts of the micro uneven patterns, not communicated with suction holes of the later-described adsorbing members 6 and 7, so as to penetrate front and back surfaces and to suck and discharge air between the close contact surfaces of each of the master media 3 and 4 and the slave medium 2.

The lower adsorbing member 6 (as well as the upper adsorbing member 7) is provided to be a disc-shape with size corresponding to that of the master medium 3 in an adsorbing surface 6a, which has been finished to be a flat surface with a planeness(flatness?) in which the center line surface roughness Ra is set in the range of 0.01 to 0.1 μm. On this adsorbing surface 6a, about 25 to 100 suction holes 6b are substantially uniformly opened, each having a diameter of about 2 mm or lower. The suction holes 6b are connected through a suction passage (not shown) led out from the inside of the adsorbing member 6 to the outside of the lower press-contact member 8 to a vacuum pump for suction. The back side of the master medium 3 in close contact with the adsorbing surface 6a is vacuum-adsorbed, and the flatness of the master medium 3 is corrected along the adsorbing surface 6a.

The lower and upper press-contact members 8 and 9 are disc-shaped, one or both are provided to be axially movable and perform opening and closing operations with a opening/closing mechanism (pressing mechanism, connecting mechanism or the like), not shown in the figure. Both are pressed into contact with each other by predetermined pressure. Flanges 8a and 9a are provided on the outer peripheries of the lower and upper press-contact members 8 and 9. During the closing operation, the flanges 8a and 9a of the upper and lower press-contact members 8 and 9 abut each other to hold the inside in a hermetically sealed state. In the center of the lower press-contact member 8, a pin 8b is provided to be engaged with the center hole of the hub 2b of the slave medium 2 for positioning. In addition, the lower and upper press-contact members 8 and 9 are connected to a rotational mechanism (not shown) and driven to rotate integrally.

With regard to the close contact body 10, magnetic transfer is repeatedly carried out for a plurality of slave media 2 by the lower and upper master media 3 and 4. First, the center positions of the lower and upper master media 3 and 4 are aligned respectively with the center positions of the adsorbing surfaces 6a and 7a (not shown) of the lower and upper adsorbing members 6 and 7, then said master media are vacuum-adsorbed and held. Then, in an open state where the upper and lower press-contact members 9 and 8 are separated from each other, the slave medium 2 having been subjected to initial magnetization beforehand is set by aligning the center position thereof with that of the master medium and set the upper and lower press-contact members 9 and 8 are brought close to each other to execute the closing operation, and the master media 3 and 4 are brought into close contact with both surfaces of the slave medium 2. Then, by movements of the upper and lower magnetic field application units 5 or movement of the close contact body 10, the upper and lower magnetic field application units 5 are brought close to the upper and lower surfaces of the close contact body 10. Transfer magnetic fields are applied by the magnetic field application units 5 while the close contact body 10 is rotated, and the transfer information of each of the lower and upper master media 3 and 4 is magnetically transferred and recorded on the recording surface of the slave medium 2.

The magnetic field application units 5 for applying the initial magnetic field and the transfer magnetic field are constructed, in the case of in-plane recording, for example, in a manner that ring-type head electromagnets, each having a coil wound on a core with a gap extended in the radial direction of the slave medium 2, are disposed above and below the close contact body 10. The upper and lower magnetic field application units apply transfer magnetic fields generated in the same direction, parallel to the track direction. The magnetic field application unit 5 may be disposed only on one side, alternatively permanent magnet devices may be disposed on both sides or on one side. The magnetic field application unit 5 may also be rotated and moved.

In the case of vertical recording, the magnetic field application unit 5 is constructed in a manner that electromagnets or permanent magnets having different polarities are disposed above and below the close contact body 10 composed of the slave and master media 2 and 3. A magnetic field is generated in a vertical direction and applied to the close contact body 10. In the case of partial application of a magnetic field, entire-surface magnetic transfer is carried out by moving the magnetic field or by moving the close contact body 10 composed of the slave and master media 2 and 3.

According to the described embodiment, when the master media 3 and 4 are brought into close contact with both surfaces of the slave medium 2, by using the adsorbing members 6 and 7 to vacuum-adsorb the master media 3 and 4 to the respective adsorbing surfaces 6a, 7a having a high degree of flatness, it is possible to correct and enhance flatness of the master media 3 and 4. Since close contact is realized by pressing said upper and lower flat master media 3 and 4 with enhanced flatness to the slave medium 2 while sandwiching the slave medium 2, the slave medium 2 and each of the master media 3 and 4 can be brought into close contact with each other uniformly on the entire surface without any gaps. Then, magnetization patterns accurately corresponding to uneven patterns formed in the master media 3 and 4 can be transferred and recorded on the recording surfaces of the slave medium 2. Moreover, since the master media 3 and 4 are corrected to be flat before being placed into close contact with the slave medium 2, the master media 3 and 4 are not deformed, and no rubbing with the slave medium 2 and no consequent damages occur. Thus, it is possible to improve durability and quality.

FIG. 3 is an exploded perspective view showing a close contact body 20 according to the second embodiment and shows an example of a one-surface transfer. The close contact body 20 includes: the lower master medium 3 for transferring information such as a servo signal to the lower recording surface of a slave medium 2; an elastic body 11

(cushion material) brought into contact with the upper recording surface of the slave medium 2; the lower press-contact member 8 having the lower adsorbing member 6 for correcting flatness by adsorbing and holding the lower master medium 3; and the upper press-contact member 9 for holding the elastic body 11. These components are pressed into contact in a state where the center positions thereof are aligned, the master medium 3 is brought into close contact with one surface of the slave medium 2, and the elastic body 11 is brought into close contact with the opposite surface thereof. In other words, the upper master medium 4 of the first embodiment shown in FIG. 2 is replaced by the elastic body 11, and other portions are similarly constructed. The holding of the elastic body 11 in the upper press-contact member 8 is carried out by vacuum adsorption or other methods.

The slave medium 2 is a flexible disc (or hard disc) having a hub 2b fixed in the center of a disc recording medium 2a similar to that of the first embodiment. In addition, the lower master medium 3 and the lower adsorbing member 6 are also similar to those of the first embodiment. The master medium 3 is formed to be an annular disc and provided with a transfer information bearing plane on one surface with micro uneven patterns brought into close contact with the recording surface of the slave medium 2. The back side opposite to the one surface of the master medium 3 is vacuum-adsorbed on an adsorbing surface 6a having suction holes 6b in the lower adsorbing member 6, and flatness of the master medium 3 is corrected along the adsorbing surface 6a.

The elastic body 11 is formed of material having an elastic property into a disc shape and held by the upper press-contact member 9. The material of the elastic body 11 has a characteristic of being deformed following the surface shape of the slave medium 2 during close contact pressure application, and being restored to a pre-pressure application surface property at the time of the removal of the slave medium 2 from the master medium 3. A specific material for the elastic body 11 can be selected from general rubber such as silicon rubber, polyurethane rubber, fluorine-containing rubber, butadiene rubber, Teflon rubber, viton rubber, or a foamed resin such as a sponge rubber. The surface of the elastic body 11 which contacts the slave medium 2 is formed in a planar shape parallel to the master medium 3 or a convex shape to protrude to the slave medium 2 side.

In the close contact body 20 of the embodiment, magnetic transfer is repeatedly performed for the plurality of slave media 2 by the lower master medium 3. First, the center position of the lower master medium 3 is aligned with the center position of the adsorbing surface 6a of the lower adsorbing member 6, and said master medium 3 is vacuum-adsorbed and held thereto. Then, in an open state where the upper and lower press-contact members 8 and 9 are separated from each other, the center position of the slave medium 2 is aligned with the center position of the master medium 3 and set. Then, the upper and lower press-contact members 9 and 8 are brought close to each other to execute a closing operation, and the master medium 3 is brought into close contact with one surface of the slave medium 2 by the pressing of the elastic body 11. Subsequently, as in the foregoing case, the upper and lower magnetic field application units 5 are brought close to the upper and lower surfaces of the close contact body 20. A transfer magnetic field is applied by the magnetic field application unit 5 while the close contact body 20 is rotated, and the transfer information of the lower master medium 3 is magnetically transferred and recorded on one surface of the slave medium 2. Then, in a different process, the upper master medium 4 is brought into close contact with the opposite side of the slave medium 2, and magnetic transfer is carried out in a similar manner.

According to the described embodiment, when the master medium 3 is brought into close contact with one surface of the slave medium 2, the master medium 3 is vacuum-adsorbed on the adsorbing surface 6a having high flatness by the adsorbing member 6, thereby correcting and enhancing the flatness thereof, and the slave medium 2 is pressed into close contact with this lower flat master medium 3 by the elastic body 11 of the opposite side so as to be sandwiched therebetween. Thus, uniform close contact can be realized on their full surfaces without any gaps between the slave and master media 2 and 3, and magnetization patterns accurately corresponding to uneven patterns formed in the master medium 3 can be transferred and recorded in the recording surface of the slave medium 2.

FIG. 4 is a sectional view showing the main portions of a close contact body 30 according to a third embodiment. The adsorbing member 16 of a lower press-contact member 18 in the close contact body 30 of the embodiment is made of a porous substance, other components are constituted similarly to those of the foregoing embodiments shown in FIGS. 2 and 3, and similar magnetic transfer is performed. In the case shown in FIG. 2, the adsorbing member of the upper press-contact member is also made of a porous substance.

The porous substance constituting the adsorbing member 16 is a plate-like member made of a rigid body having continuous bubbles permeable in a direction from the upper surface to the lower surface. The upper adsorbing surface 16a is formed to have predetermined flatness, and micro suction holes are opened.

In the center of the lower press-contact member 18, a recess is formed to be deeper than a thickness of the adsorbing member 16, and the adsorbing member 16 is fixed in an upper portion thereof. A space between the lower surface of the adsorbing member 16 and the recess bottom surface of the lower press-contact member 18 constitutes a suction passage 18d, and this suction passage 18d is connected through a rotary shaft 18c to an external vacuum pump. A flange 18a is formed in the outer periphery of the lower press-contact member 18.

By the close contact body 30 of the described embodiment, the center position of the master medium 3 is aligned with the center position of the adsorbing surface of the adsorbing member 16 made of the porous substance, and the entire surface thereof is vacuum-adsorbed and held, and the flatness thereof is corrected. The adsorbing member 16 made of the porous substance enables the air suction structure to be simplified, and the suction holes of the adsorbing surface 16a to be micronized. Uneven patterns corresponding to suction holes are not likely to be formed on the surface of the master medium 3 and, especially, good suction and holding can be carried out for the master medium 3 having low rigidity while planeness is ensured.

In each of the foregoing embodiments, when the master medium 3 is removed from the adsorbing member 6 or 16, the removal should preferably be performed by feeding pressurized air to the suction holes. In other words, by cutting off suction pressure applied by the vacuum pump and feeding pressurized air, adsorption between the master medium 3 and the adsorbing surface 6a or 16a is released. The adsorption may also be released into atmosphere. In this way, the removal of the master medium 3 can be facilitated, and work efficiency can be increased while damage and the like are prevented during the replacement of the master medium 3.

FIG. 5 is a plan view showing the master medium 3 and the slave medium 2. The master medium 3 is formed to be a disc-shape and to have a center hole 3a. When the transfer information is a servo signal, servo patterns P (transfer patterns) are formed in thin areas extended substantially radially from the center (slightly curved in the drawing) at equal intervals, on the information bearing plane of the master medium 3. By magnetic transfer, magnetization patterns corresponding to the servo patterns P are transferred and recorded in the slave medium 2. The slave medium 2 is disc-shaped and has a center hole 2c. An annular area excluding inner and outer peripheral parts is set in a recording area 21 for performing recording and reproducing, and this area becomes a head movable area.

An outer diameter Dm of the master medium 3 is larger than an outer diameter 21a of the recording area 21 of the slave medium 2, preferably larger than an outer diameter Ds of the slave medium 2. An inner diameter dm of the master medium 3 is smaller than an inner diameter 21b of the recording area 21 of the slave medium 2, preferably smaller than an inner diameter ds of the slave medium 2. In other words, the outer circumference or the inner circumference of the master medium 3 is positioned outside of the outer circumference or inside of the inner circumference of the head movable area.

Since the outer and inner circumference portions of the master medium 3 are subjected to cutting or grinding, unevenness on the order of at most several micrometers are formed. If such a portion is brought into close contact with the recording area 21 of the slave medium 2 during magnetic transfer, the slave medium 2 may be damaged. Thus, as described above, by setting the outer circumference portion or the inner circumference portion of the master medium 3 outside of the recording area 21 (head movable area) of the slave medium 2, the slave medium 2 is not damaged during close contact. Even if micro steps are formed in the slave medium 2 after the close contact, it is possible to prevent shocks from being applied to the head.

Now, a specific example of magnetic transfer by in-plane recording will be described by referring to FIGS. 6A to 6C. First, as shown in FIG. 6A, the slave medium 2 is subjected to initial magnetization (DC demagnetization) by applying an initial magnetic field Hin thereto in one direction in a track direction. Then, as shown in FIG. 6B, the recording surface (magnetic recording part) of this slave medium 2 is brought into close contact with the information bearing plane having a magnetic layer 32 (soft magnetic substance) formed to cover micro uneven patterns on a substrate 31 of the master medium 3, and magnetic transfer is carried out by applying a transfer magnetic field Hdu in a direction reverse to the initial magnetic field Hin in the track direction of the slave medium 2. The transfer magnetic field Hdu is absorbed by the magnetic layer 32 of an adhering convex part, preventing the magnetic field of this part from being reversed, while the magnetic field of the other part is reversed. Thus, as shown in FIG. 6C, information corresponding to a formed pattern of the convex and concave parts of the magnetic layer 32 on the information bearing plane of the master medium 3 is magnetically transferred and recorded in the magnetic recording surface (track) of the slave medium 2 which is in close contact therewith. Though not shown, magnetic transfer is similarly carried out even when a similarly formed upper master medium 4 is simultaneously brought into close contact with the upper recording surface of the slave medium 2.

Even if the uneven patterns on the substrate 31 of the master medium 3 are uneven negative patterns reverse to the positive patterns of FIG. 6A to 6C, the same information as that in the above can be magnetically transferred and recorded by setting the direction of the initial magnetic field Hin and the direction of the transfer magnetic field Hdu reverse to those in the above.

When the substrate 31 is a ferromagnet such as Ni and the like, the magnetic transfer can be carried out by the substrate 31 itself, and it is not necessary to cover the substrate 31 with the magnetic layer 32 (soft magnetic substance). However, better magnetic transfer is carried out by providing a magnetic layer 32 having good transfer properties. When the substrate 31 is made of non-magnetic substance, it is necessary to provide the magnetic layer 32 on the substrate 31.

Preferably, a protection film made of diamond-like carbon (DLC) or the like should be provided on the magnetic layer, and a lubricant layer may be provided. More preferably, as the protection film, a DLC film of 5 to 30 nm and a lubricant layer should be present. In addition, a close contact strengthening layer made of Si and the like may be provided between the magnetic layer and the protection film. This protection film enables contact durability to be enhanced, and the magnetic transfer to be performed many times.

Next, the formation of the master medium will be described. For the substrate of the master medium, nickel, silicon, quartz plate, glass, aluminum, an alloy, ceramics, a synthetic resin or the like is used. Uneven patterns are formed by a stamper method, a photo-fabrication method or the like.

According to the stamper method, a photoresist is formed on a glass plate (or quartz plate) having a smooth surface by a spin coat method or the like. A laser beam (or electron beam) modulated in accordance with a servo signal is radiated onto the photoresist while the glass plate is rotated. A predetermined pattern is formed on the entire surface of the photoresist by exposure. For example, a pattern equivalent to a servo signal extended linearly from a rotational center in a radial direction is formed in each track by exposure in a portion corresponding to each frame on a circumference of the glass plate. Then, the photoresist is subjected to developing processing, and the exposed portions are removed. Thus, an original disc having uneven patterns with the photoresist is obtained. Subsequently, plating (electroforming) is performed for the surface of the original disc based on the uneven patterns on the surface thereof, and an Ni substrate having positive uneven patterns is formed. Then, the Ni substrate is peeled off from the original disc. This substrate is used as a master medium as is, or used as a master medium after coating a magnetic layer and a protection film on the uneven patterns if necessary.

Alternatively, a substrate having negative uneven patterns may be formed by plating the foregoing original disc to form a second original disc, and using this second original disc to execute plating. Further, a substrate having positive uneven patterns may be formed by plating the second original disc or pressing resin liquid against the second original disc for hardening to form a third original disc, and plating the third original disc.

On the other hand, patterns by photoresist are formed on the glass plate, and then holes are formed in the glass plate by etching. The photoresist is removed, and an original disc is obtained. Subsequently, the same formation steps as the above may be performed, and thus a substrate may be obtained.

For a material of the substrate made of metal, Ni or an Ni alloy can be used. Various metal film growth methods including electroless plating, electroforming, sputtering and ion plating can be applied for the plating for forming the substrate. A depth of each uneven pattern (height of a relieve) of the substrate should preferably be set in the range of 80 nm to 800 nm, more preferably in the range of 100 nm to 600 nm.

The formation of the magnetic layer (soft magnetic substance) is performed in such a manner that a magnetic material is formed by a plating method, and by a vacuum film growth method including a vacuum evaporation method, a sputtering method, an ion plating method and the like. As a magnetic material of the magnetic layer, one can be selected from Co, a CO alloy (CoNi, CoNiZr, CoNbTar, or the like), Fe, an Fe alloy (FeCo, FeCoNi, FeNiMo, FeAlSi, FeAl, and FeTaN), Ni, an Ni alloy (NiFe). FeCo and FeCoNi are particularly preferable as the material for the magnetic layer. A thickness of the magnetic layer should preferably be set in the range of 50 nm to 500 nm, more preferably in the range of 100 nm to 400 nm.

A resin substrate may be formed by using the original disc, and a magnetic layer may be provided on the surface thereof to be used as a master medium. As a resin material of the resin substrate, one can be selected for use from an acrylic resin such as polycarbonate and polymethyl methacrylate, vinyl chloride resin such as polyvinyl chloride and polyvinyl chloride copolymer, an epoxy resin, amorphous polyolefin, polyester and the like. Polycarbonate is preferable in terms of humidity resistance, dimensional stability and cost. If a molded component has burrs, the burrs are removed by burnishing or polishing. An ultraviolet curing resin or an electron beam curing resin may be used and coated on the original disc by a spin coat method or a bar coat method. The heights of the pattern relieves of the resin substrate should preferably be set in the range of 50 to 1000 nm, more preferably in the range of 100 to 500 nm.

The master medium is obtained by coating a magnetic layer on the micro patterns of the surface of the resin substrate. The formation of the magnetic layer is performed in such a manner that a magnetic material is grown by a vacuum film growth method including a vacuum evaporation method, a sputtering method, an ion plating method and the like and by a plating method.

On the other hand, the photofabrication method is performed in such a manner that a photoresist is coated on the smooth surface of a plane-shaped substrate, and patterns in accordance with information signals are formed by exposure and developing processing using a photo mask in accordance with the patterns of servo signals. Then, in an etching step, the substrate is subjected to etching according to the patterns, and holes, each having a depth equal to a thickness of the magnetic layer, are formed. Subsequently, a magnetic material is grown up to the surface of the substrate with a thickness equal to the depth of the formed holes by a vacuum film growth method including an evaporation method, a sputtering method, an ion plating method and the like and by a plating method. Then, the photoresist is removed by a lift-off method, and the surface is polished. Burrs are removed if they exist, and the surface of the substrate is smoothed.

In the case of the vertical recording system, a master medium substantially similar to that in the foregoing in-plane recording is applied. In the case of such vertical recording, magnetic transfer is carried out by subjecting the slave medium to initial DC magnetization beforehand in a direction in a vertical direction, bringing the slave medium into close contact with the master medium, and applying a transfer magnetic field in a vertical direction roughly reverse to that of the initial DC magnetization. The transfer magnetic field is absorbed by the magnetic layer of the adhering convex part of the master medium, the vertical magnetic field of a portion corresponding to the adhering convex part is reversed, and magnetization patterns corresponding to the uneven patterns can be recorded in the slave medium.

Next, the slave medium will be described. For the slave medium, a disc magnetic recording medium such as a high-density flexible disc, a hard disc or the like, having a magnetic recording portion (magnetic layer) formed in both surfaces or one surface is used. The magnetic recording portion is composed of a coating type recording layer or a metal thin film magnetic recording layer. For a magnetic material of the metal thin film magnetic recording layer, one can be selected for use from Co, a Co alloy (CoPtCr, CoCr, CoPtCrTa, CoPtCrNbTa, CoCrB, CoNi or the like), Fe, an Fe alloy (FeCo, FePt, or FeCoNi). These materials have high magnetic flux densities and magnetic anisotropy in a direction identical to a direction of the magnetic field application (the direction of the magnetic field application is parallel to the surfaces of the master medium and the slave medium in the case of an in-plane recording, and the direction of the magnetic field application is perpendicular to the surfaces of the master medium and the slave medium in the case of a vertical recording), and thus preferable because a clear transfer can be performed by use of them. To allow a portion (supporting body side) under the magnetic material to have necessary magnetic anisotropy, a nonmagnetic base layer should be provided. This nonmagnetic base layer needs to coincide with the magnetic layer in a crystal structure and a lattice constant. To allow the nonmagnetic base layer to have the same crystal structure and the same lattice constant with those of the magnetic layer, Cr, CrTi, CoCr, CrTa, CrMo, NiAl, Ru or the like is used.

What is claimed is:

1. A magnetic transfer apparatus for allowing a master medium bearing transfer information and a slave medium subjected to a magnetic transfer to be closely contacted with each other and for magnetically transferring the transfer information to said slave medium by applying transfer magnetic field to said master medium and said slave medium, the apparatus comprising:

a press contact member;

an adsorbing member disposed on a surface of said press contact member, said adsorbing member having a flat surface for adsorbing and holding a backside of said master medium, wherein said master medium is brought into close contact with said slave medium with an enhanced flatness of said master medium.

2. A magnetic transfer apparatus, comprising:

a first master medium bearing transfer information on one surface thereof;

a first press contact member disposed above said first master medium, which has a first adsorbing member on one surface thereof, the adsorbing member absorbing and holding the other surface of said first master medium;

a slave medium subjected to a magnetic transfer, the slave medium being disposed below said first master medium;

a second master medium bearing transfer information on one surface thereof, the second master medium being disposed below said slave medium; and a second press contact member disposed below said second master medium, which has a second adsorbing member on one surface thereof, the second adsorbing member absorbing and holding the other surface of said second master medium, wherein said first press contact member, said first master medium, said slave medium, said second master medium and said second press contact member are allowed to be closely contacted with each other, and a magnetic transfer for magnetically transferring the transfer information from the first and second master media to both of the surfaces of said slave medium is performed by applying a magnetic field to said first and second master media and said slave medium while rotating said first and second press contact members, said first and second master media and said slave medium, and wherein further, the transfer information on said first master medium is magnetically transferred to a first side of said slave medium facing said first master medium and the transfer information on said second master medium is magnetically transferred to a second side of said slave medium facing said second master medium.

3. The magnetic transfer apparatus according to claim 2, wherein the first and second adsorbing members have also a function to enhance flatness of said first and second master media, respectively when the magnetic transfer is performed.

4. The magnetic transfer apparatus according to claim 2, wherein said slave medium is a flexible disc having a disc-shaped recording media in which a hub is fixedly attached at a center of the disc-shaped recording media.

5. The magnetic transfer apparatus according to claim 2, wherein said first and second adsorbing members respectively have a plurality of suction holes formed in an adsorbing surface thereof.

6. The magnetic transfer apparatus according to claim 5, wherein a plurality of micro holes are formed at portions of each of said first and second master media, the portions being other than a forming part of a micro uneven pattern and the micro holes penetrating through said first and second master medium are formed so as not to communicate with the suction holes.

7. The magnetic transfer apparatus according to claim 2, wherein said adsorbing member is made of a substance having an adsorbing surface.

8. The magnetic transfer apparatus according to claim 2, wherein said adsorbing member is made of a porous substance having an adsorbing surface.

9. The magnetic transfer apparatus according to claim 6, wherein the suction holes are connected through a suction passage to a vacuum pump.

10. A magnetic transfer apparatus, comprising:
a first press contact member;
an elastic body disposed below said first press contact member;
a slave medium to be subjected to a magnetic transfer, the slave medium being disposed below said elastic body;
a master medium bearing transfer information on one surface thereof, the master medium being disposed below said slave medium; and
a second press contact member disposed below said master medium, which has an adsorbing member on one surface thereof, the adsorbing member adsorbing and holding another surface of said master medium,
wherein said first press contact member, said elastic body, said slave medium, said master medium and said second press contact member are allowed to be closely contacted with each other, and the magnetic transfer for magnetically transferring the transfer information from the master medium to one surface of said slave medium is performed by applying magnetic field to said master medium and said slave medium while rotating said first and second press contact members, said master medium and said slave medium.

11. The magnetic transfer apparatus according to claim 10, wherein said elastic body is made of a substance which deforms in accordance with a shape of the surface of said slave medium in applying a close contact pressure, and which restores to an original surface shape thereof when said slave medium is detached from said master medium.

12. The magnetic transfer apparatus according to claim 10, wherein said slave medium is a flexible disc having a disc-shaped recording media in which a hub is fixedly attached at a center of the disc-shaped recording media.

13. The magnetic transfer apparatus according to claim 10, wherein said adsorbing member has a plurality of suction holes formed in an adsorbing surface thereof.

14. The magnetic transfer apparatus according to claim 10, wherein a plurality of micro holes are formed at portions of said master medium, the portions being other than a forming part of a micro uneven pattern and the micro holes penetrating through said master medium so as not to communicate with the suction holes.

15. The magnetic transfer apparatus according to claim 10, wherein said adsorbing member is made of a substance having an adsorbing surface.

16. The magnetic transfer apparatus according to claim 10, wherein said adsorbing member is made of a porous substance having an adsorbing surface.

17. The magnetic transfer apparatus according to claim 10, wherein the suction holes are connected through a suction passage to a vacuum pump.

* * * * *